United States Patent [19]

Muramatsu et al.

[11] Patent Number: 4,919,242
[45] Date of Patent: Apr. 24, 1990

[54] SHIFT LEVER LOCKING APPARATUS

[75] Inventors: Tadao Muramatsu, Toyota; Shinichi Yamamuro, Toyoake, both of Japan

[73] Assignees: Toyota Jidosha Kabushiki Kaisha; Chuo Hatsujo Kabushiki Kaisha, both of Aichi, Japan

[21] Appl. No.: 260,678

[22] Filed: Oct. 21, 1988

[30] Foreign Application Priority Data

Oct. 30, 1987 [JP] Japan ................... 62-166381[U]

[51] Int. Cl.⁵ ............................................. B60K 41/28
[52] U.S. Cl. ................................. 192/4 A; 180/272; 74/477
[58] Field of Search ............... 180/272, 273, 278; 60/376, 582, 545, 550; 192/4 A; 74/473 R, 477

[56] References Cited

U.S. PATENT DOCUMENTS

| 4,096,930 | 6/1978 | Viscardi | 192/4 A |
| 4,473,141 | 9/1984 | Mochida | 192/4 A |
| 4,614,256 | 9/1986 | Kuwayama et al. | 192/4 A |

FOREIGN PATENT DOCUMENTS 60-20447 2/1985 Japan .
64-24422 2/1989 Japan .

Primary Examiner—Richard A. Bertsch
Attorney, Agent, or Firm—Oliff & Berridge

[57] ABSTRACT

An apparatus for locking a shift lever associated with an automobile automatic transmission in the parking range is provided. A locking member prevents any movement of the shift lever from the parking range to another range except when the brake pedal is stepped down. A pivotal movement of the brake pedal is transmitted to the locking member through a cam rotatably mounted on the brake pedal, a cam follower, and a cable.

8 Claims, 2 Drawing Sheets

SHIFT LEVER LOCKING APPARATUS

BACKGROUND OF THE INVENTION

This invention relates to an apparatus for locking a shift lever associated with an automobile automatic transmission in the parking range.

As is well known in the art, in automobiles having an automatic transmission mounted, the engine and the transmission gear are connected through a fluid coupling. The power of the engine is transmitted to the wheels except when the transmission gear is kept in the parking or neutral state. In general, a provision is made such that the engine can be started only when a shift lever for drive control is set in the parking or neutral range. It is also a conventional practice that the brake pedal must be stepped down to accomplish a braked state before the shift lever can be moved from the parking or neutral range to any driving range such as the drive range.

Such a locking apparatus was proposed by the same assignee as the present invention in Japanese Utility Model Application No. 62-119707. The locking apparatus is briefly described. The locking apparatus includes a detent pin and a ratchet plate having a plurality of engagement portions for engaging the detent pin. In association with those engagement portions which the detent pin engages when the shift lever is set to the parking and neutral ranges, a lock piece is provided for preventing the detent pin from disengaging from the engagement portion. A slide plate is provided in combination with the lock piece for moving the lock piece between locking and unlocking positions. An electromagnet is disposed for driving the slide plate. When the requirement is met, for example, if the brake pedal is stepped down or additionally, the engine is rotating at a revolution number below a certain value, the electromagnet is actuated to move the slide plate and hence, the lock piece to the unlocking position, allowing the shift lever to be changed from the parking or neutral range to any desired driving range. In contact with the detent pin is so slant that an increased push-button manipulation can positively unlock the lock piece independent of the electromagnet, also allowing free change of the shift lever.

Since the locking apparatus of the above construction uses the electromagnet as an actuator, it is suitably combined with an automatic transmission of the electronic control type wherein control is carried out by detecting various parameters followed by electric processing. The locking apparatus, however, is not suitable for an automatic transmission of the hydraulic control type because several sensors must be additionally incorporated, resulting in a further complicated structure. This adds to the disadvantage that the locking apparatus is rather complicated as such because it is designed to lock the shift lever in the neutral range as well as the parking range.

There is a need for a shift lever locking apparatus which is of a simple construction and advantageously applicable to not only automatic transmissions of the electronic control type, but also automatic transmissions of the hydraulic control type.

SUMMARY OF THE INVENTION

An object of the present invention is to provide a shift lever locking apparatus capable of locking the shift lever in the parking range and unlocking the shift lever therefrom through mechanical means only without resorting to electric means.

Another object of the present invention is to provide a shift lever locking apparatus in which any manufacturing or attachment error of parts does not affect locking and unlocking operation.

According to the present invention, there is provided a shift lever locking apparatus in combination with an automobile having a pivotally movable brake pedal and a shift lever adapted to be pivotally turned and set at any desired one of positions corresponding to a plurality of driving states including a parking state. The apparatus comprises a detent pin associated with the shift lever so as to be moved up and down by push-button manipulation, a ratchet plate including at least an engagement portion for engaging the detent pin to prevent pivotal turn of the shift lever when the shift lever is set at the parking state, means for locking the detent pin, the locking means preventing the detent pin from disengaging from the engagement portion in a locking state, but allowing the detent pin to disengage from the engagement portion in an unlocking state, a cam mounted to the brake pedal for rotation about an axis parallel to the pivotal axis of the brake pedal and having a cam surface and a bearing surface remote therefrom, a follower adapted to be moved in one direction in contact with the cam surface, a stop disposed in consistent contact with the bearing surface of the cam for bearing the reaction of cam action, and a wirelike member connecting the follower and the locking means, whereby when the brake pedal is stepped down, the follower is moved in one direction through the cam to thereby change the locking means from the locking state to the unlocking state through the wirelike member.

BRIEF DESCRIPTION OF THE DRAWINGS

The above and other objects, features, and advantages of the present invention will be better understood from the following description taken in conjunction with the accompanying drawings, in which.

DESCRIPTION OF THE PREFERRED EMBODIMENTS

Figure 1:
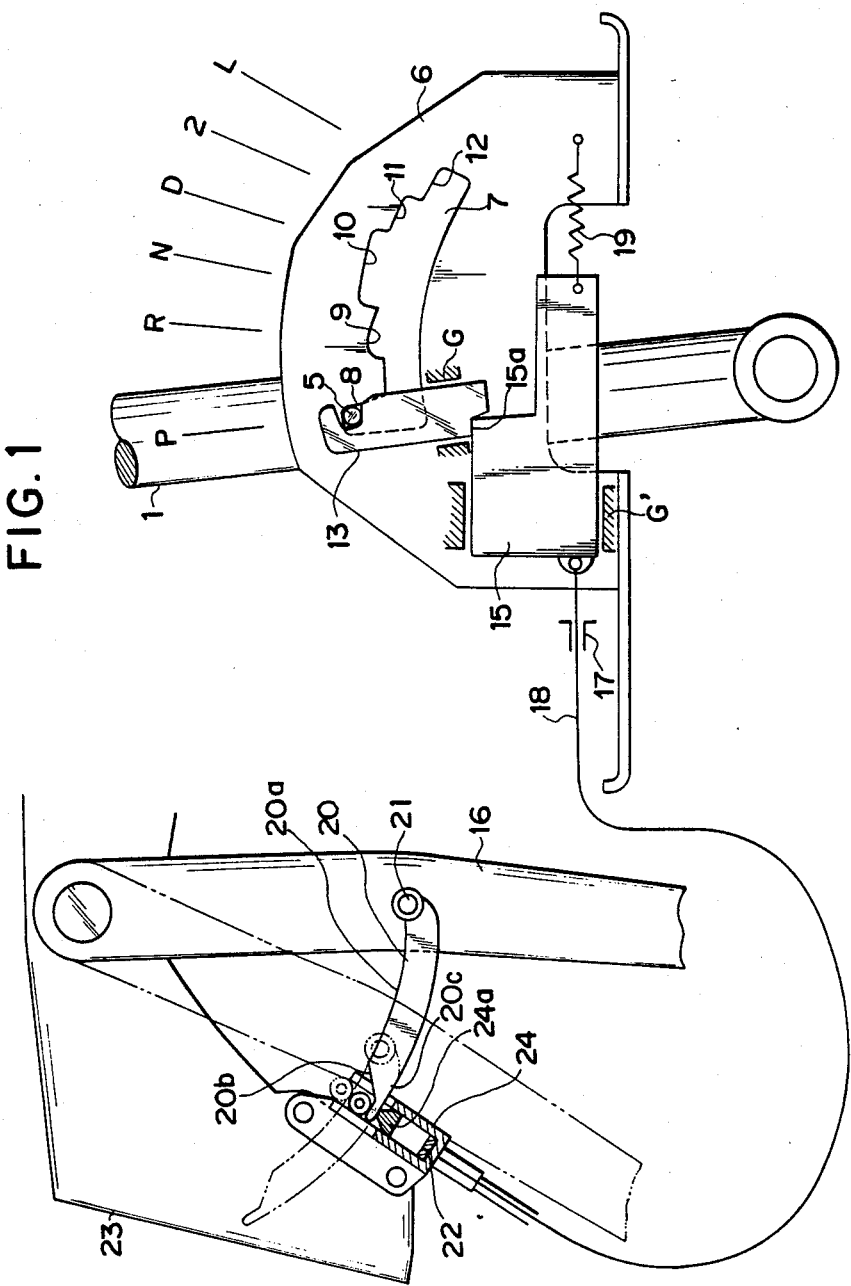
FIG. 1 schematically illustrates a shift lever locking apparatus according to one embodiment of the present invention.
Figure 2:
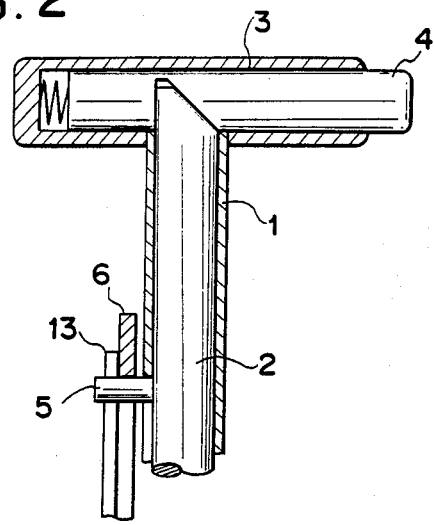
FIG. 2 is a cross-sectional view of the shift lever.

Referring to FIG. 1, there is illustrated a shift lever locking apparatus according to one embodiment of the present invention. Like conventional shift levers, a shift lever 1 extending in an approximately vertical direction may be turned about a horizontal pivot to select a desired driving range in an automatic transmission. The shift lever is associated with a detent mechanism which is also of the same construction as in the prior art. More particularly, the shift lever 1 has received therein a rod 2 which is movable up and down in an axial direction as shown in FIG. 2. The shift lever 1 is provided at its top with a horizontally extending grip portion 3 in a T shape. The grip portion 3 has received therein a knob 4 which is manually movable in a direction parallel to the axis of the pivot about which the shift lever 1 is turned. The knob 4 has a bevelled surface which engages a bevelled surface of the rod 2. Lateral movement of the knob 4 by manual manipulation is converted into vertical movement of the rod 2 through the wedge engagement. The rod 2 is provided with a detent pin 5 extending in a direction parallel to the axis of the pivot about which the shift lever 1 is turned.

A ratchet plate 6 which defines the range of movement of the detent pin 5 is disposed adjacent the shift lever 1 and has a major surface extending parallel to the plane in which the shift lever 1 is turned. The ratchet plate 6 is formed in the major surface with a slot 7 of the shape as best shown in FIG. 1. The slot 7 includes along its upper edge a first engagement portion 8 for holding the detent pin 5 in the parking range, a second engagement portion 9 for holding the detent pin 5 in the reverse range, a third engagement portion 10 for holding the detent pin 5 in the neutral and drive ranges, a fourth engagement portion 11 for holding the detent pin 5 in the "2" range, and a fifth engagement portion 12 for holding the detent pin 5 in the "L" range. These engagement portions 8, 9, 10, 11 and 12 are configured such that upon shifting operations from the reverse range to the neutral range, from the neutral range to the drive range, from the drive range to the neutral range, and from the "L" range to the "2" range further to the drive range, the detent pin 5 is automatically disengaged from the corresponding engagement portion, but upon other shifting operations, the knob 4 must be pushed in to force down the rod 2 to disengage the detent pin 5 from the engagement portion.

Figure 3:
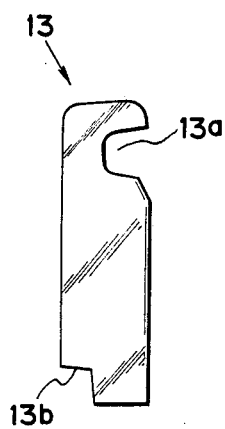
FIG. 3 illustrates a lock piece used in the embodiment of FIG. 1.
Figure 4:
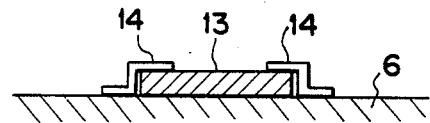
FIG. 4 is a schematic view of one exemplary means for guiding the lock piece.

In parallel with the ratchet plate 6, a lock piece 13 which is movable approximately vertically is provided for vertical movement at a position corresponding to the first engagement portion 8 with which the detent pin 5 is engaged when the shift lever 1 is set to the parking range. The lock piece 13 serves to prevent the detent pin 5 from disengaging from the first engagement portion 8. The lock piece 13 may be in the form of a generally rectangular plate as shown in FIG. 3, for example. The lock piece 13 is provided at an upper end with a recess 13a which is open in one longitudinal side. The detent pin 5 is movable into and out of the recess 13a. The lock piece 13 is further provided at a lower end with a pit 13b which is formed by cutting out the lower corner on the other longitudinal side. Means G for guiding the lock piece 13 in a vertical direction may be of any desired structure. For example, as shown in FIG. 4, a pair of spaced-apart fixtures 14 are disposed so as to fit over the opposite longitudinal edges of the lock piece 13 so that the lock piece 13 may be held for vertical movement. Below the lock piece 13 is disposed a slide plate 15 which is movable nearly perpendicular to the direction of movement of the lock piece 13. The slide plate 15 includes a shoulder 15a adapted to engage the pit 13b of the lock piece 13 to prevent the lock piece 13 from withdrawing from the raised position, that is, to prevent the detent pin 5 from disengaging from the first engagement portion 8. The lock piece 13 thus forms locking means with the slide plate 15. Like the guide means G associated with the lock piece 13, means G' for guiding the slide plate 15 in a horizontal direction as viewed in FIG. 1 may be of any desired structure, for example, a pair of spaced-apart guide bars as shown in FIG. 4.

The slide plate 15 is interlocked with a brake pedal 16 through interlocking means including a cam, a cam follower, and a cable. The brake pedal 16 is pivotably connected to a brake bracket 23 through a pivot. The interlocking means is described in detail. A cable 18 extends through a flexible sheath 17. One end of the sheath 17 is attached to a predetermined fixed portion, for example, a base plate (not shown) and the other end is secured to a holder 24 which will be described later. One end of the cable 18 is connected to the slide plate 15 via a pin. Then withdrawal of the cable 18 moves the slide plate 15 to the left in FIG. 1, that is, in a direction to disengage the shoulder 15a from the pit 13b of the lock piece 13. A spring 19 is connected between the slide plate 15 and the ratchet plate 6 for biasing the slide plate 15 to the right, that is, in a direction opposite to the direction of withdrawal through the cable 18.

A cam plate 20 is rotatably mounted to the brake pedal 16. More particularly, the cam plate 20 is a substantially arcuate strip which is circular about the pivotal axis of the brake pedal 16 when placed coaxially. The cam plate 20 has an arcuate inside surface 20a, a ramp surface 20b which is formed by cutting out a distal or left end portion of the plate, and an outside bearing surface 20c. The cam plate 20 at one end is mounted to the brake pedal 16 through a pivot 21 which extends parallel to the pivot of the brake pedal 16.

Figure 5:
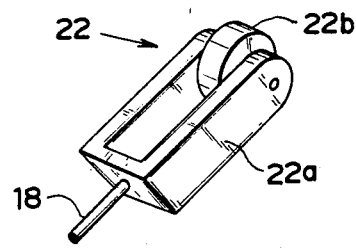
FIG. 5 is a perspective view showing a follower used in the embodiment of FIG. 1

A cam follower 22 is cooperatively connected to the cam plate 20. The follower 22 is illustrated in FIG. 5 as comprising a U-shaped member 22a and a roller 22b rotatably mounted between free ends of the U-shaped member. The follower 22 and the cam plate 20 are assembled such that the cam plate 20 extends through the space between the U-shaped member and the roller. Then the roller 22b rolls on the ramp and arcuate surfaces 20b and 20a of the cam plate 20 which form a cam surface. The follower 22 is received for linear motion in the holder or enclosure 24 which is fixedly secured to the brake bracket 23. That is, the holder or enclosure 24 holds the follower 22 such that the follower is movable in one direction. Inside the holder 24 is attached a stop 24a which is spaced a predetermined distance from the pivot of the brake pedal 16 so as not to obstruct the movement of the follower 22. The free end of the cam plate 20 is disposed between and in contact with the roller 22b of the follower 22 and the stop 24a of the holder 24. The cam plate 20, which is rotatably supported by the brake pedal 16 through the pivot 21, acts to move up the follower 22 by the height of the ramp 20b with respect to the stop 24a when the brake pedal 16 is rotated clockwise. It is to be noted that the height of the ramp 20b is the distance of the ramp from the bearing surface 20c as measured in the direction of movement of the follower 22. The other end of the cable 18 whose one end is connected to the slide plate 15 is connected to the follower 22, more particularly to the base of the U-shaped member 22a remote from the roller 22b as shown in FIG. 5. Preferably, the longitudinal axis of the holder 24 and hence the direction of movement of the follower 22 is approximately in a straight line passing the pivotal axis of the brake pedal 16.

The operation of the apparatus of the above-mentioned construction is described below.

FIG. 1 shows the shift lever 1 which is locked in the parking range. In this state, the detent pin 5 is engaged with the first engagement portion 8 of the ratchet plate 6 while the lock piece 13 is brought to the raised position and prevented by the slide plate 15 from moving down. It is thus impossible to disengage the detent pin 5 from the first engagement portion 8 by pushing in the knob 4 of the shift lever 1 for the purpose of moving down the detent pin 5. It is thus prohibited to manipulate the shift lever 1 from the parking range to another range.

When the brake pedal 16 is stepped down, the cam plate 20 is moved together with the brake pedal 16 and advanced deeper (to the left) through the space of the U-shaped member 22a as shown by broken lines in FIG. 1, with the lower surface of the cam plate 20 sliding along the stop 24a. As the roller 22b rolls on the ramp surface 20b and then the arcuate surface 20a, the follower 22 is moved obliquely upward by the height of the ramp 20b as viewed in FIG. 1. As a result, the follower 22 draws the cable 18. The slide plate 15 is then moved to the left in FIG. 1 to disengage its shoulder 15a from the pit 13b of the lock piece 13. Then the lock piece 13 is released from the prohibited downward movement. With the lock piece 13 kept unlocked, the knob 4 can be pushed in to move down the detent pin 5 to disengage the pin from the first engagement portion 8 so that the shift lever 1 may be turned or shifted to another range. Once the shift lever 1 is changed from the parking range to the other range, the detent pin 5 is disengaged from the recess 13a of the lock piece 13 so that the lock piece 13 is maintained at the lowered position. Then the shoulder 15a of the slide plate 15 abuts the other side edge of the lock piece 13 to prevent the slide plate 15 from moving back to the locking position shown in FIG. 1. At this point, the follower 22 is kept in the raised position by the cable 18, and the roller 22b does not interfere with the movement of the cam plate 20 and hence, the brake pedal 16 because the roller 22b is kept apart from the cam plate 20.

In the setting where the arcuate inside surface 20a of the cam plate 20 is located concentric with the pivot of the brake pedal 16, once the brake pedal 16 is stepped down to cause the cam plate 20 to pull up the follower 22 a predetermined distance, the roller 22b rolls on the arcuate surface 20b so that the follower 22 and hence, the cable 18 is drawn in no more. It is unnecessary to apply an increased toeing force to the brake pedal 16 which adversely affects a braking feel. In addition, no extra load is applied to the components including the cable 18, which is advantageous for the strength and durability of the mechanism.

When it is desired to shift the shift lever 1 to the parking range again, the detent pin 5 first enters the recess 13a of the lock piece 13 and then engages the first engagement portion 8. The lock piece 13 is drawn upward along with this movement of the detent pin 5 while the resilient force of the spring 19 moves the slide plate 15 back to the locking position shown in FIG. 1.

The follower 22 is always moved a fixed distance, that is, the height of the ramp 20b of the cam plate 20 in response to the pivotal motion of the brake pedal 16 even if there is an error in the attachment of the cam plate 20 with respect to the brake pedal 16. This is because the cam plate 20 is rotatably mounted to the brake pedal 16 via the pivot 21 and the stop 24a bears the reaction to the cam action of the cam plate 20 urging the follower 22 upwardly.

Since the locking apparatus of the present invention carries out locking and unlocking of the shift lever to and from the parking range through mechanical means and not through electrical means, it is advantageously applicable to an automatic transmission of the hydraulic control type. Since the apparatus locks the shift lever only at the parking range, the mechanism associated with the shift lever 1 is simple.

Since the follower 22 is received in the holder 24 and connected to the cable 18 with the sheath 17 secured to the holder 24, the mechanism associated with the brake pedal 16 is simple. It is easy to assemble these components. The use of the cam plate 20 maintains a braking feel unchanged and contributes to the improved durability of the associated components.

Although the locking means is composed of two members, the lock piece 13 and the slide plate 15 in the illustrated embodiment, the present invention is not limited thereto. For example, another design may be contemplated wherein only a slide plate is used to prevent the detent pin from disengaging from the first engagement portion of the ratchet plate. Although the locking state is cancelled through a linear motion, such unlocking operation may be carried out through a pivotal motion. The mechanism for transmitting the movement of the brake pedal to the locking means is not limited to the cam plate, follower and cable shown in the embodiment, and any desired transmitting mechanism may be used. The cam is not limited to the substantially arcuate strip shown in the embodiment. Any desired cam may be employed as long as it can convert a pivotal movement of the brake pedal into a linear movement of a wirelike member. For example, the cam may be a wedge having a linear ramp surface.

What we claim:

1. In combination with an automobile having a pivotally movable brake pedal and a shift lever adapted to be pivotally turned and set at any desired one of positions corresponding to a plurality of driving states including a parking state,
    an apparatus for locking the shift lever, comprising
    a detent pin associated with the shift lever so as to be moved up and down by push-button manipulation,
    a ratchet plate including at least one engagement portion for engaging the detent pin to prevent pivotal turn of the shift lever when the shift lever is set at the parking state,
    means for locking the detent pin, said locking means preventing the detent pin from disengaging from the engagement portion in a locking state, but allowing the detent pin to disengage from the engagement portion in an unlocking state,
    a cam mounted to the brake pedal for rotation about an axis parallel to the pivotal axis of the brake pedal and having a bearing surface and a cam surface which has a varying height from the bearing surface,
    a follower adapted to be moved in one direction in contact with the cam surface,
    a stop disposed in consistent contact with the bearing surface of the cam for bearing the reaction of cam action, and
    a wirelike member connecting said follower and said locking means,
    whereby when the brake pedal is stepped down, the follower is moved in one direction through the cam to thereby change the locking means from the locking state to the unlocking state through said wirelike member.

2. The apparatus of claim 1 which further comprises
a brake bracket to which the brake pedal is pivotally mounted and
a holder fixedly secured to the brake bracket, said follower being held for linear motion by the holder.

3. The apparatus of claim 2 wherein said follower includes a roller engaging said cam.

4. The apparatus of claim 2 which further comprises a sheath through which the wirelike member extends, one end of the sheath being secured to said holder.

5. The apparatus of claim 1 wherein said locking means includes
a lock piece disposed adjacent said ratchet plate and having a recess for engaging said detent pin, the lock piece being movable up and down, and
a slide plate disposed below said lock piece and movable between a first position at which the slide plate engages said lock piece and a second position at which the slide plate is out of engagement with said lock piece, the slide plate being connected to said wirelike member.

6. The apparatus of claim 5 wherein said lock piece has a pit formed at a lower end thereof and said slide plate has a shoulder adapted to engage the pit to prevent the lock piece from moving down.

7. The apparatus of claim 6 which further comprises a resilient member connected to said slide plate for biasing said slide plate in a direction to engage the slide plate shoulder with the lock piece pit,
said slide plate being connected to the wirelike member and the resilient member such that the wirelike member draws the slide plate against the biasing force of the resilient member in response to a linear movement of the follower.

8. The apparatus of claim 5 wherein said locking means further includes a guide member disposed to fit over the lock piece for linearly guiding the lock piece and another guide member disposed to fit over the slide plate for linearly guiding the slide plate.

* * * * *